United States Patent [19]

Vander Eyken et al.

[11] 4,392,446
[45] Jul. 12, 1983

[54] PEDESTAL MOUNT AUTOPILOT

[75] Inventors: Gerardus H. Vander Eyken, Longbranch; James J. Thoman, Mississauga, both of Canada

[73] Assignee: Cinkel Industries, Ltd., Mississauga, Canada

[21] Appl. No.: 251,464

[22] Filed: Apr. 6, 1981

[51] Int. Cl.³ .............................................. B63H 25/04
[52] U.S. Cl. ................................................ 114/144 R
[58] Field of Search ....................... 114/144 R, 144 E; 74/388 PS, 494, 480 B, 484 R, 532; 318/588, 590, 591; 180/79.1; 364/424, 457; 244/76 R, 79, 175

[56] References Cited

U.S. PATENT DOCUMENTS

| | | | |
|---|---|---|---|
| 3,138,133 | 6/1964 | Hatch | 318/588 |
| 3,761,791 | 9/1973 | Ware | 318/588 |
| 3,888,201 | 6/1975 | Zuvela | 318/588 |
| 4,170,953 | 10/1979 | Pounder | 114/144 E |

Primary Examiner—Trygve M. Blix
Assistant Examiner—Jesús D. Sotelo

[57] ABSTRACT

A self contained electro-mechanical arrangement for use in autopilot for yachts for securement to a steering wheel pedestal column is disclosed. The arrangement comprises a magnetic directional indicator, sensing apparatus associated with the magnetic directional indicator for determining movement thereof, and electrical drive controlled by the sensing apparatus. The electrical drive includes an electric motor, and a transmission, with the electric motor being bi-directional to allow rotation of the output shaft of the transmission in either direction. A mechanical drive is associated with the transmission for engaging the steering wheel shaft of such yacht wherein the motor and the directional indicator are separated to reduce any effect of the motor on the movement of the magnetic directional indicator.

17 Claims, 9 Drawing Figures

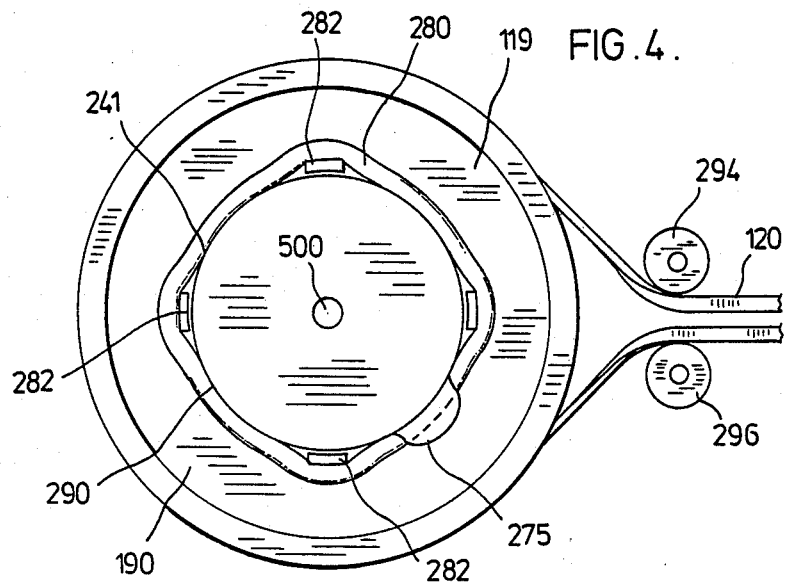
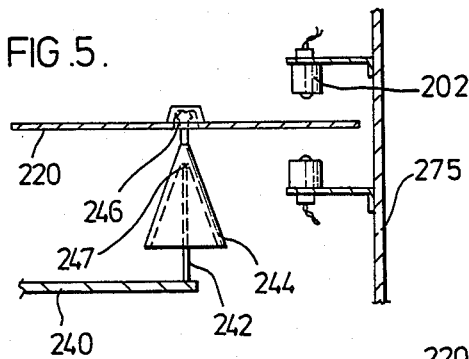
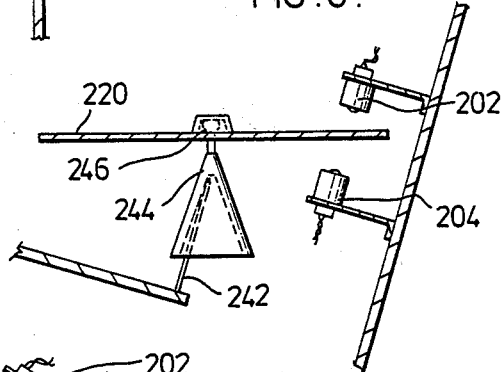
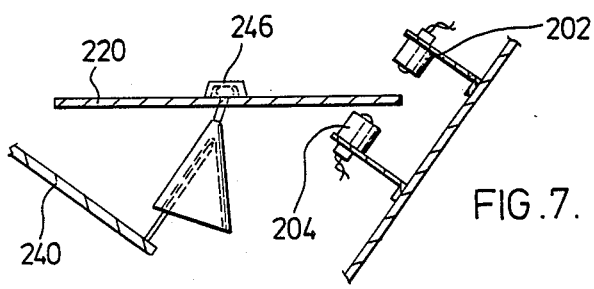

PEDESTAL MOUNT AUTOPILOT

FIELD OF THE INVENTION

This invention relates to autopilots for use in yachts including sailing yachts. More particularly the invention relates to a mechanical arrangement for use in an autopilot which is mounted on the steering wheel pedestal of a yacht.

BACKGROUND OF THE INVENTION

In the past various autopilots have been manufactured for use in sailing yachts and are of a design that can easily be converted for yachts having either a tiller or steering wheel operation. All of these earlier units are either quite bulky in size or having individual components for mounting at different locations within the boat. For example, the electric motor used in these systems can affect the output of the magnetic directional indicator resulting in reading fluctuations. To overcome this, the magnet directional indicator or compass is physically separated from the autopilot for mounting in a different location in the boat whereby the interaction problem between the motor and the compass is alleviated. Although this provides a simple solution to the problem, it is not completely satisfactory in that two units must be mounted within the boat and at least one wire must interconnect these units.

Although the prior art systems do function adequately, they are unduly complicated to install and often awkward to use.

The present invention seeks to mitigate these short comings and provide a unit with improved operation characteristics.

SUMMARY OF THE INVENTION

A self contained electro-mechanical arrangement for use in an autopilot for yachts according to the present invention is adapted for securement to a steering wheel pedestal column and comprises a magnetic directional indicator, sensing means associated with the magnetic directional indicator for determining movement thereof relative to said sensing means, and electrical drive means controlled by the sensing means, wherein the electrical drive means includes an electric motor and a transmission. The electric motor is bi-directional to allow rotation of an output shaft of the transmission and a mechanical drive means associated with the transmission in either direction. The mechanical drive means engages the steering wheel shaft of such yacht for driving thereof. The motor and the directional indicator are physically separated within the autopilot to reduce any effect of the motor on the movement of the directional indicator. According to the present invention a self-contained autopilot is possible which physically houses both a magnetic directional indicator and an electrical motor. The interaction of the electrical motor on the magnetic directional indicator does not substantially change its performance and, therefore, the autopilot functions satisfactorily. This is accomplished by physically separating the individual components and in a preferred aspect by providing an electrical motor wherein the permanent magnets thereof are secured to a steel casing to minimize any leakage flux.

Because the autopilot is self-contained and adapted for securement to the pedestal column of a steering wheel system, it may easily be installed with the power supply wires of the unit being contained within the steering pedestal resulting in a very neat overall system which is aesthetically pleasing to the purchaser.

According to an aspect of the invention, a mechanical feedback system is provided, which is in constant communication with the steering system of the yacht. Because of this, operation of the autopilot is simplified.

According to a further aspect of the invention, the mechanical arrangement includes a mechanical feedback means for moving the casing of the magnetic directional indicator in response to movement of the drive means. The casing is clutchingly secured to a pulley which forms part of the feedback means and this pulley is positioned intermediate of the drive means and the casing, whereby movement of the drive means causes responsive movement of the casing while allowing independent movement of the casing relative to the drive means.

BRIEF DESCRIPTION OF THE DRAWINGS

Preferred embodiments of the invention are shown in the drawings wherein:

FIG. 4 is a bottom view showing the clutching engagement of the magnetic directional indicator and a pulley;

FIG. 5 is a partial vertical section through the magnetic directional indicator;

FIGS. 6 and 7 are schematics of the magnetic directional indicator at various angles caused by either roll or pitch of the yacht;

DETAILED DESCRIPTION OF THE EMBODIMENTS OF THE INVENTION

Figure 1:
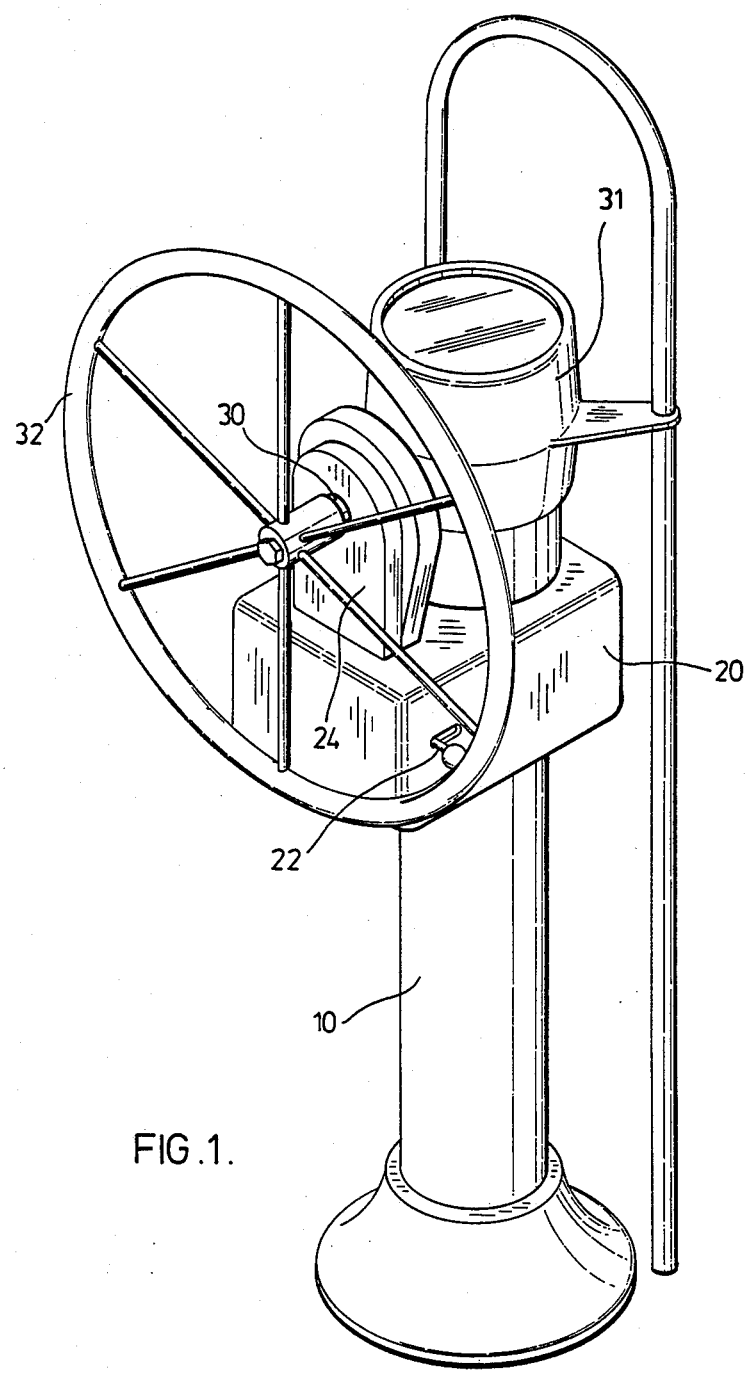
FIG. 1 is a perspective view of the autopilot secured to the steering wheel pedestal column of a yacht.

A perspective view of the autopilot is shown generally as 20 in FIG. 1 secured to a steering wheel pedestal column 10. The steering wheel 32 is secured to shaft 30 which drives a gearing arrangement enclosed in housing 31 for controlling the rudder of a yacht. Chain casing 24 is secured atop the autopilot 20 and encloses the chain drive and sprocket secured about shaft 30. A lever 22 is shown projecting from the side of the autopilot housing and is used to disengage or engage the clutch mechanism for driving the steering wheel shaft by means of the motor within the autopilot.

Figure 2:
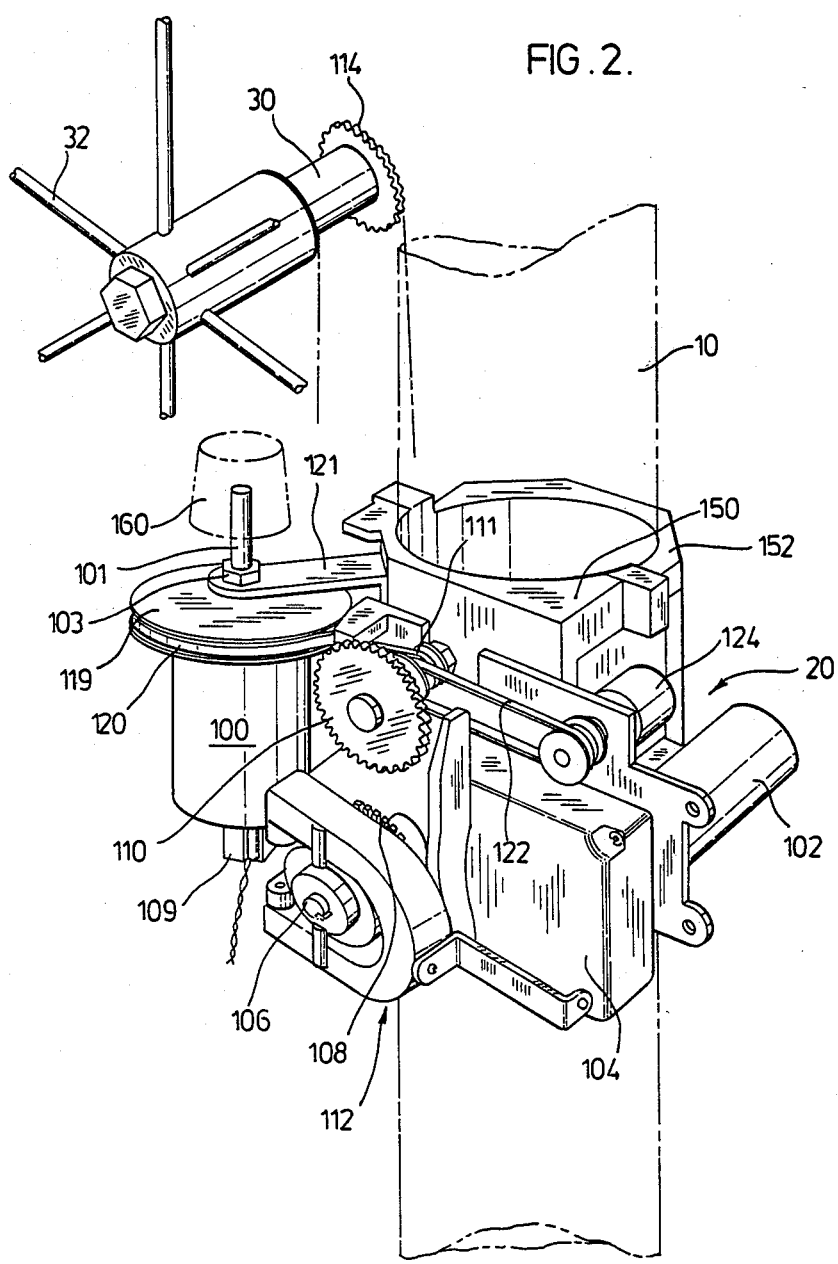
FIG. 2 is a view similar to FIG. 1 with the outer casing of the autopilot removed.

As can be seen in FIG. 2 the mechanical arrangement for the autopilot includes an electric motor 102, and a transmission 104 secured to the motor 102 for driving output shaft 106 of the transmission. A clutching arrangement generally shown as 112 is associated with the output shaft 106 to allow engagement of the transmission with the chain sprocket 108. A magnetic directional indicator 100 is generally positioned to the opposite side of the autopilot and is associated with the pulley 119 which may be rotated by movement of the belt 120. The magnetic directional indicator 100 may be rotated independently of the pulley 119 by rotation of the control knob 160 which causes rotation of shaft 101 which is secured to the casing of the magnetic directional indicator. Both the pulley 119 and the magnetic directional indicator 100 are rotatably supported outside the collar 150 with the lower portion of the directional indicator having a combination mechanical and electrical connection 109. This connection 109 provides the necessary power to the sensor located within the casing of the magnetic directional indicator as well as enabling an output signal to be passed from the sensing means. The output of the sensing means is then used to control the motor 102 to correct the course of a yacht in accordance with the movement of the directional indicator.

Figure 3:
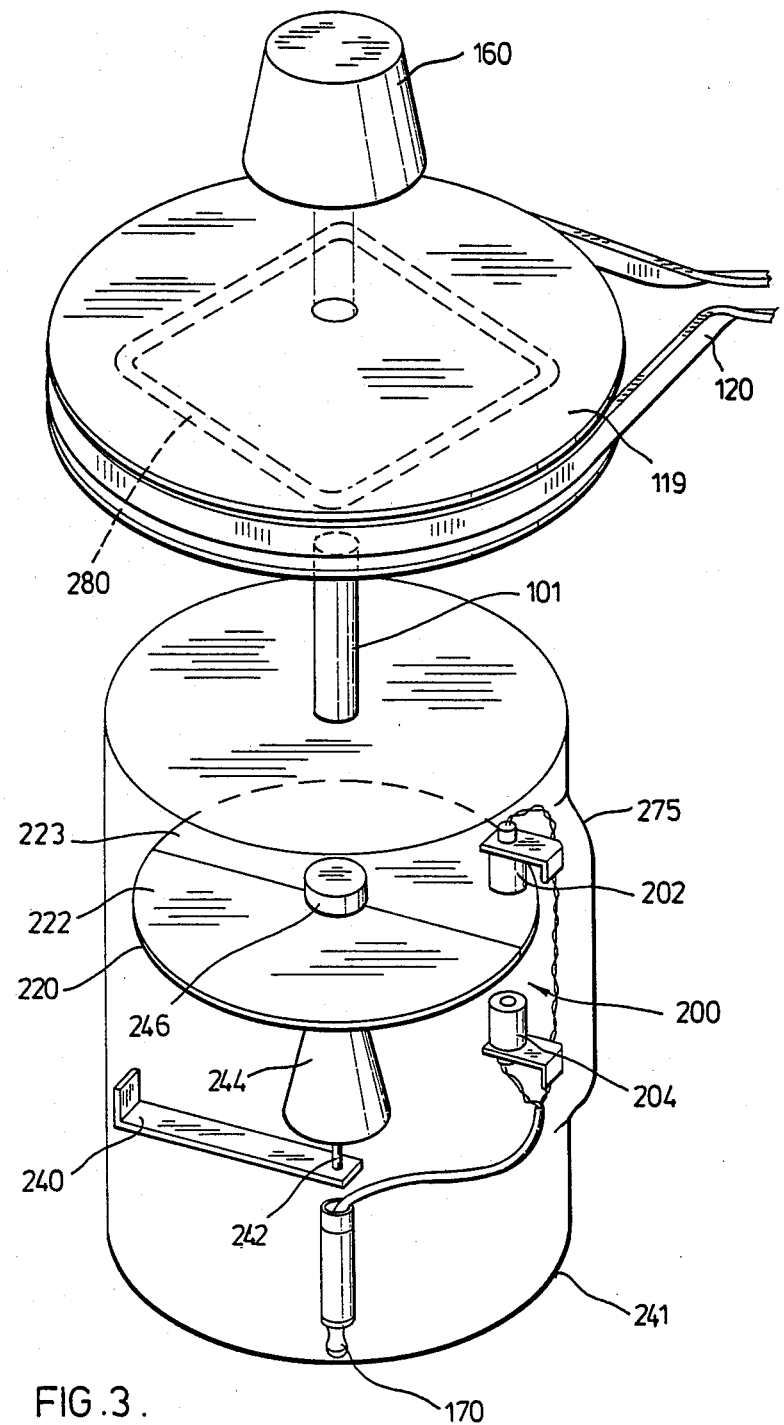
FIG. 3 is a perspective view illustrating the components of the magnetic directional indicator and the association of the directional indicator with a pulley.

The pulley 119 is rotatably secured to bracket 121 and is held relative thereto by nut 103. The shaft 101 passes through the center of nut 103 which acts as a bearing for this shaft. The magnetic directional indicator is held in position at least partially by a clutching arrangement on the underside of pulley 119 which is shown in FIGS. 3 and 4.

The device, as shown in FIG. 2, is adapted for a chain drive between sprocket 108 and sprocket 114 secured to the steering wheel shaft 130 with an idler sprocket 110 disposed between these sprockets and adapted to move with movement of the chain drive. Other arrangements such as a belt drive may be possible; however the chain drive is preferred due to its positive engagement characteristics. The idler sprocket 110 includes an output gear portion 111 for driving belt 120 and belt 122. Therefore once the unit is activated any movement of the chain is a direct result of the motor 102 being activated and this will result in at least partial rotation of the idler sprocket 110. With this movement the output gear 111 causes movement of the belts 120 and 122 and a reactive movement of the pulley 119 and magnetic directional indicator 100 and also rotation of the potentiometer 124.

As the magnetic directional indicator is always in communication with the steering system of the yacht, due to the position of the clutching arrangement 112, the autopilot may be temporarily disengaged and then re-engaged without the need to return the yacht to its original course. For example, a departure of 30 degrees from the original course at the time of re-engagement will automatically be corrected, which would not be the cause if the feedback system was not in constant communication with the steering system. Disengagement of the autopilot may be required due to entering a particular congested area, or possibly due to land obstructions. However once these have been past, the autopilot may be re-engaged without requiring further adjustment. As can be appreciated, other autopilots using directional indicators other than the magnetic type can benefit from this principle.

Potentiometer 124 merely reflects the maximum end positions for the steering wheel 32 whereby the steering wheel linkage is locked. If this should occur, for example by the steering wheel being rotated to one extreme end position, further corrective action by the motor 102 could not be accomplished and could result in the motor burning out due to the linkage and motor being locked. To avoid this, potentiometer 124 reflects the end positions of the steering wheel linkage and will render motor 102 inoperable prior to the linkage being locked. To accomplish this sprocket 108 is always being driven in response to movement of the steering wheel shaft 30 such that potentiometer 124 always reflects the position of the steering wheel linkage once the unit has been properly installed. The signal from potentiometer 124 is electrically processed to render the motor inoperable at either end position of the steering linkage to avoid the burn out problems. Similarly belt 120 also causes movement of pulley 119 in response to movement of the steering wheel shaft 30.

As can be more fully appreciated with respect to FIG. 3, the magnetic directional indicator includes a magnetic compass card 220 which is secured within non-ferrous casing 241 of the magnetic directional indicator. This magnetic card is divided in half and has a light transmitting region 222 and a non-light transmitting region 223. The sensing means 200 includes a light emitting source 202 and a light receiving source 204 which are separated by the magnetic card 220. When portion 223 of the card is located between the light emitting source and the light sensing source no signal will result from the receiver 204. However when portion 222 of the magnetic card is located between these sensors, light will be received and a signal created. In order to activate the system, the yacht is set on its course and control knob 160 is rotated to position the sensors relative to the magnetic card such that region 222 and 223 are essentially in alignment with the sensing means. Alignment of the sensing means and the card can be indicated by a light or by the motor turning off. Therefore any deviation of the yacht from its course will cause the magnetic card to rotate about its jewel movement 246 and cause the sensing means to either align with area 222 or 223. This will result in a change in the signal of the sensing means and this signal is then processed to control the motor 102.

As can be appreciated a dead band area between areas 222 and 223 is provided to assure that the motor is not always in operation. However after substantially movement of the card between the sensing means the motor will be activated causing movement of the transmission and rotation of the output shaft 106. This in turn causes rotation of sprocket 108 which by means of a chain drives the steering wheel shaft 30. Similarly idler sprocket 110 will rotate causing movement of belt 120 and therewith rotation of pulley 119.

The movement of pulley 119 and the casing 241 of the magnetic directional indicator will also cause rotation of the sensing means relative to the magnetic card and reducing the necessary time the motor will run before being shut off. This motor shuts off when the magnetic card is moved relative to the sensing means to allow alignment similar to that shown in FIG. 3. This mechanical feedback system causes the motor not to run as long as would be expected without the feedback system and thus avoids the motor over compensating in course correction which would result in a zig zag effect. This feedback system tends to smooth out the deviations from the course over time and provides a system which is referred to as a non-hunting type.

The engagement of the casing 241 of the magnetic directional indicator and the pulley 119 is shown in FIG. 4 where the pulley is provided with a number of downwardly projecting studs 282 spaced about the periphery of the casing 241. Both the pulley and the casing are aligned on a common axis passing through the center of the pulley generally shown as 500 in the drawings. An 'O'ring 280 serves to clutchingly secure the casing 241 relative to the pulley 119. This 'O' ring is stretched about the lugs 282 which are positioned such that a portion of the 'O' ring must engage the exterior of casing 241 when the casing is brought into contact with the pulley. Thus a friction engagement is provided between the casing and the pulley whereby the casing may be rotated independently of the pulley by rotation of control knob 160, whereas rotation of pulley 119 through the movement of belt 120 also results in rotation of the casing 241. This particular arrangement allows a simple mechanical feedback system for the sensing means 200 with rotation of the steering wheel shaft 30, and also allows the casing to be independently rotated as required to allow course selection by the operator. Because of the particular layout of the equipment, as shown in FIG. 2 the belt 120 passes through rollers 294 and 296 to allow twisting thereof for securement over the output gear 109 of the idler sprocket 110.

As previously mentioned this autopilot is suitable for use in sailing vessels which are subject to both the roll and pitch which require movement of the compass card 220 about its jewel movement 246 to maintain a generally horizontal position even though the casing may be at a substantial angle from the vertical. To accomodate this movement the light source 202 and the receiver 204 are spaced either side of the card a sufficient distance to accommodate a maximum angle of approximately 60 degrees, although movements in excess of 50 degrees are not that common. The jewel movement 246 by itself can accommodate up to approximately 40 degrees however a second gimble mount 247 is provided by the cone 244 and its support pin 242. This support pin is secured by bracket 240 to the casing 241 of the magnetic directional indicator.

As can be seen in FIG. 5 partial rotation of the casing 241 has caused pin 242 to pivot relative cone 244 however little movement of the jewel movement 246 has occurred at this time. However as shown in FIG. 7 further rotation of the casing 241 results in further rotation of the card 220 relative to the jewel movement 246 while still maintaining the card between the light emitter 202 and the light receiver 204. With this particular type of arrangement the card 220 may freely rotate with changes in direction of the yacht even while the yacht may be undergoing pitch or roll or a combination thereof in angles up to approximately 60 degrees. This dual movement may not be required in all cases where the jewel movement is considered sufficient.

Figure 8:
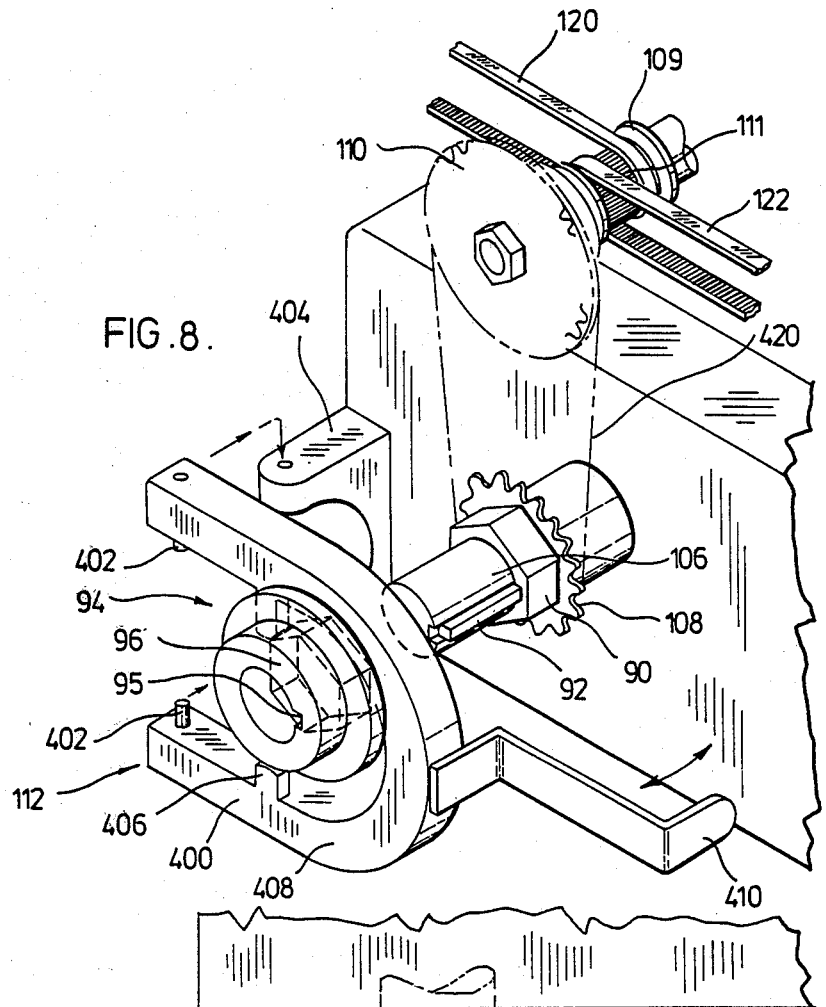
FIG. 8 is a perspective view of the clutching arrangement used to engage the transmission with the chain drive for causing movement of the steering wheel shaft.
Figure 9:
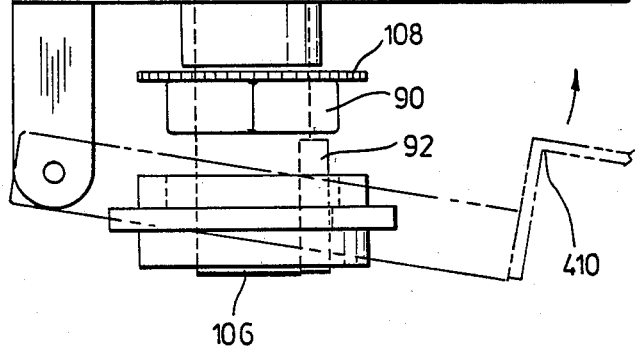
FIG. 9 is a top view showing the interrelationship of the clutching mechanism of FIG. 8.

The clutching arrangement for engaging the output shaft 106 of the transmission and the drive sprocket 108, journalled thereon, is shown in the exploded view of FIG. 8 and the top view of FIG. 9. The connector generally shown as 94 includes an end section 95, keyed to the shaft 106 by key 92, and slidable along the length of the shaft. A recess portion 96 is provided on the rear face of the connector and is adapted to slide over the hexagonal nut portion 90 of the drive sprocket 108. By moving the connector along shaft 106 and causing the nut portion 90 to align with the recess portion 96, which can be accomplished by merely bringing these components together and rotating the wheel until the nut and recess portion align, provides positive locking engagement between the output shaft 106 and the drive sprocket 108. To facilitate movement of the connector 94 along the shaft a pivoted C-shaped member 408 loosely receives the connector between lugs 406 disposed either side of member 408. These lugs serve to maintain the connector relative to the C-shaped bracket 408, however allow some movement of the connector in the length of the C-shaped member as well as pivotal movement of the connector relative thereto.

As can be seen in FIG. 9 this pivotal movement of the connector is required when the member 406 is moved outwardly to cause disengagement of the connector with the nut portion 90, while still maintaining sliding engagement of the connector with output shaft 106. Again when one wants to activate the autopilot, lever 410, which is associated with lever 22, is moved inwardly towards the autopilot causing abutting of the connector 94 with the nut portion 90 and alignment of these portions by slight rotation of the steering wheel if necessary. Once these portions are aligned the connector may move further inwardly positively engaging the nut portion 90 and allowing transmission of the rotational movement of output shaft 106 to the drive sprocket 108.

This particular clutching arrangement allows the steering wheel shaft to be in constant engagement with the output sprocket 108 allowing potentiometer 124 to constantly be in communication with this shaft so the end positions of the steering linkage are known. Similarly, the casing of the magnetic directional indicator remains in communication with the steering system of the yacht. Furthermore this clutching arrangement is very simple and rugged in design providing a very reliable clutching mechanism which will not require extensive maintenance.

It has been found that by physically separating the electric motor 102 and the magnetic directional indicator that the affect of leakage flux from the motor does not substantially affect the movement of the magnetic directional indicator and the card 220 generally aligns with the magnetic north. In order to minimize magnetic flux leakage from the motor 102 it can be provided with a steel casing with the magnets secured to the casing to minimize this leakage. Shielding of the motor could be provided although low leakage motors are available which do not require further shielding.

The motor is generally operated from a 12-volt voltage supply and produces approximately 40 inch-oz of torque. This torque is increased through the use of the transmission which has a ratio of approximately 175:1. It is apparent that the final autopilot will require an electrical circuit board; however, this board is merely inserted within the autopilot casing and is used to process the output signal of the sensing means in order to control the electric motor 102. This type of circuit board normally allows for adjustment in accordance with sea conditions which is essentially an electrical adjustment to control the dead band between the different regions 222 and 223 of the magnetic card 220 and there is often a control for the sensitivity of the unit to accommodate for sudden movements of the kind that are not in response to the change in course of the boat. For example, this may result from a large wave hitting the yacht resulting in a reactive movement of card 220. To minimize movement of this card a dampening fluid is maintained within the casing 241 of the magnetic directional indicator and is a clear fluid.

Although preferred embodiments have been described herein in detail to be understood by those skilled in the art, the variations may be made thereto without departing from the spirit of the invention or the scope of the appended claims.

The embodiments of the invention in which an exclusive property of privilege is claimed are defined as follows:

1. An electromechanical arrangement for use in an autopilot for yachts comprising a directional indicator, positionable sensing means associated with said directional indicator for determining movement thereof relative to said sensing means, electrical drive means controlled by said sensing means including an electrical motor and a transmission, said electrical drive means providing the input for said transmission with the output of said transmission connected to a mechanical drive means for engaging the steering system of such yacht and means associated with said sensing means and said mechanical drive means for moving said sensing means relative to said directional indicator in response to movement of said mechanical drive means, and clutch means to allow selective engagement and disengagement of said electrical motor from such steering system, wherein said means associated with said sensing means is in constant communication with such steering system.

2. An arrangement as claimed in claim 1, wherein the movement of said sensing means in response to movement of said mechanical drive means provides negative feedback to reduce the response of the electrical motor.

3. A mechanical arrangement as claimed in claim 1 wherein said clutch means is located between said mechanical drive means and said transmission for selective disengagement thereof whereby said clutch means engages said transmission and said mechanical drive means during operation of the autopilot while allowing said mechanical drive means to move independently of said transmission when the clutch means is disengaged.

4. A mechanical arrangement as claimed in claim 3 wherein said tarnsmission includes an output shaft and said clutch means includes a connector secured on said output shaft to rotate therewith and slide along the length thereof, said mechanical drive means including a drive sprocket bearingly supported on said output shaft and shaped to positively engage said connector when the same are brought into axial contact by movement thereof along said output shaft.

5. A mechanical arrangement as claimed in claim 4 including a pivoted actuator for moving said connector along said output shaft, said actuator loosely engaging said connector whereby movement of said pivoted actuator causes a responsive linear movement of said connector along said output shaft.

6. A mechanical arrangement as claimed in claim 3, wherein said connector is keyed to said output shaft, said drive sprocket including a centrally disposed hexagonal surface which cooperates with a similar shaped recess in said connector to positively engage said drive sprocket during axial movement of said connector and drive sprocket towards each other along the shaft.

7. An electromechanical arrangement for use in an autopilot for yachts comprising a directional indicator, sensing means associated with said directional indicator for determining movement thereof relative to said sensing means, electrical drive means including an electrical motor and a transmission, said electrical drive means allowing rotation of the output shaft of said transmission in either direction, mechanical drive means associated with said transmission for engaging the steering system of such yacht and a negative feedback system associated with said sensing means and said mechanical drive means for moving said sensing means relative to said directional indicator in response to movement of said mechanical drive means, and clutch means to allow selective engagement and disengagement of said electrical motor from such steering system, wherein said negative feedback system is in constant communication with such steering system.

8. An arrangement as claimed in claim 7, wherein said clutch means is located between said transmission and said mechanical drive means.

9. An arrangement as claimed in claim 1, 7 or 8, wherein said directional indicator includes a compass.

10. An arrangement as claimed in claim 7, wherein said directional indicator includes a compass mounted in a non-ferrous casing, which contains a clear dampening fluid and wherein said sensing means is attached to said casing.

11. An arrangement as claimed in claim 10, wherein said compass includes a card member divided into two sections across the surface, one of said sections not allowing the transmission of light therethrough and the other section allowing the transmission of light therethrough, said sensing means including a light source and a light receiver located either side of said card whereby the intensity of the light received is a function of the position of the card.

12. An arrangement as claimed in claim 1, 7 or 10, wherein said mechanical drive means comprises a chain trained about a sprocket freely journalled to the output shaft of said transmission and said clutch means is associated with the output shaft of said transmission and said sprocket, said chain being trainable about a drive sprocket to be secured to the steering wheel shaft of such yacht.

13. An arrangement as claimed in claim 1, 7 or 10, wherein said mechanical drive means comprises a chain trained about a sprocket freely journalled to the output shaft of said transmission and said clutch means is associated with the output shaft of said transmission and said sprocket, said chain being trainable about a drive sprocket to be secured to the steering wheel shaft of such yacht, and further including an idler sprocket secured between said drive sprocket to engage said chain, said idler sprocket including an output gear, said output gear communicating with said sensing means to cause partial rotation of said sensing means with movement of said chain to provide a negative mechanical feedback system to said sensing means.

14. A mechanical arrangement as claimed in claim 7, wherein said sensing means and said directional indicator are supported within a non-ferrous casing, said drive means including mechanical feedback means for moving said casing in response to movement of said drive means, said casing being clutchingly secured to a pulley which forms part of said feedback system, said pulley positioned intermediate of said drive means and said casing whereby movement of said drive means causes a responsive movement of said casing while allowing independent movement of said casing relative to said drive means.

15. A mechanical arrangement as claimed in claim 14, wherein said casing is rotatable relative to said pulley and is coaxial therewith.

16. A mechanical arrangement as claimed in claim 15, wherein said casing is secured to said pulley by an 'O' ring which is stretched about lugs on said pulley, positioned such that a portion of the 'O' ring between lugs engages the exterior surface of said casing.

17. A mechanical arrangement as claimed in claim 15 or 16 wherein the exterior of said casing is adapted to receive said 'O' ring thereby positively locating said casing relative to said pulley.

* * * * *